United States Patent
Dadhia et al.

(10) Patent No.: US 8,256,003 B2
(45) Date of Patent: Aug. 28, 2012

(54) REAL-TIME NETWORK MALWARE PROTECTION

(75) Inventors: Rajesh Dadhia, Issaquah, WA (US); Pradeep Bahl, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1120 days.

(21) Appl. No.: 11/801,553

(22) Filed: May 10, 2007

(65) Prior Publication Data

US 2008/0282347 A1 Nov. 13, 2008

(51) Int. Cl.
*H04L 29/06* (2006.01)
(52) U.S. Cl. ........................................................ 726/25
(58) Field of Classification Search .................. None
See application file for complete search history.

(56) References Cited

U.S. PATENT DOCUMENTS

| | | | |
|---|---|---|---|
| 5,991,881 A | 11/1999 | Conklin et al. | |
| 6,324,656 B1 | 11/2001 | Gleichauf et al. | |
| 6,408,391 B1 | 6/2002 | Huff et al. | |
| 6,415,321 B1 | 7/2002 | Gleichauf et al. | |
| 6,910,135 B1 | 6/2005 | Grainger | |
| 6,957,348 B1 | 10/2005 | Flowers et al. | |
| 6,990,591 B1 | 1/2006 | Pearson | |
| 6,993,448 B2 | 1/2006 | Tracy et al. | |
| 7,073,198 B1 | 7/2006 | Flowers et al. | |
| 7,089,589 B2 | 8/2006 | Chefalas et al. | |
| 2004/0003286 A1* | 1/2004 | Kaler et al. | 713/201 |
| 2004/0015728 A1 | 1/2004 | Cole et al. | |
| 2004/0103309 A1* | 5/2004 | Tracy et al. | 713/201 |
| 2004/0148386 A1 | 7/2004 | Bushmitch et al. | |
| 2005/0005169 A1 | 1/2005 | Kelekar | |
| 2005/0010660 A1* | 1/2005 | Vaught | 709/223 |
| 2006/0070129 A1* | 3/2006 | Sobel et al. | 726/23 |
| 2006/0070130 A1* | 3/2006 | Costea et al. | 726/24 |

OTHER PUBLICATIONS

"Active Directory", http://en.wikipedia.org/wiki/Active_Directory.
"Simple Network Management Protocol", http://www.cisco.com/univercd/cc/td/doc/cisintwk/ito_doc/snmp.htm#wp1022871.
Porras, et al., "Emerald: Event Monitoring Enabling Responses to Anomalous Live Disturbances", http://ise.gmu.edu/~xwangc/teaching/ISA774/IDS-Reading/NISSC97-EMERALD.pdf.

* cited by examiner

*Primary Examiner* — Gilberto Barron, Jr.
*Assistant Examiner* — David Le

(57) ABSTRACT

A Network State Database (NSD) can comprise information regarding the network-centric state of one or more computing devices connected to a network. The information contained in the NSD can be passively received by the NSD, or it can be actively obtained by the NSD. Additionally the NSD can comprise either a centralized collection of information, or a distributed collection of information independently maintained and conceptualized as a single entity. The information of the NSD can be used by a Network Risk Management Service (NRMS) to appropriately respond and protect the network. The NRMS can provide relevant information from the NSD to subscribers, which can independently act to protect the network. The NRMS can likewise itself instruct computing devices regarding an appropriate action, or it can itself instruct the performance of such action.

14 Claims, 7 Drawing Sheets

REAL-TIME NETWORK MALWARE PROTECTION

BACKGROUND

A network of computing devices can function as a "breeding ground" for malicious computer software. Specifically, the interconnections provided among the computing devices in a network provide pathways that can be exploited by malicious software to enable it to perform malicious actions or copy itself to other computing devices. For example, malicious software commonly known as "computer viruses" can spread from one networked computing device to the other computing devices in the network via email transmissions or file transfers across the network. Similarly, malicious software commonly known as a "computer worm" can spread from one networked computing device to the other computing devices in the network via communications through network ports that are not secured, or via communications that generate an anomalous computing situation that has not yet been fixed.

One traditional mechanism for preventing the spread of malicious software, and for inhibiting the malicious actions performed by such software, is software designed to detect and remove malicious software, which is commonly known as "anti-malware" software. Another traditional mechanism for preventing the spread of malicious software and inhibiting its actions is the use of network admission limits that can prevent computing devices from connecting to the network if they do not meet some minimum specified criteria. These traditional mechanisms can be combined by, for example, limiting access to the network to only those computing devices that comprise at least some threshold level of anti-malware software.

Network admission criteria can be based on the "health" of a computing device. The health of a computing device can be based on the ability of the computing device to protect itself against malicious software. For example, the presence of anti-malware software on the computing device can be considered to increase the health of the device. Similarly, a computing device can be considered healthy when its installed software has been properly upgraded to include updates that eliminate mechanisms previously susceptible for exploitation by malicious software. Thus, network admission criteria can include, not only the requirement of current anti-malware software, but can likewise require the presence of known software updates.

SUMMARY

To protect computing devices on a network from malicious software, the state of the computing devices of the network can continue to be monitored even after the computing device has passed any network admission criteria and has already been admitted to the network. In such a way, a computing device whose state changes in a meaningful manner after joining the network can be identified and appropriate remedial action can be taken. For example, a computing device may be sufficiently healthy to join a network but, after joining the network, the computing device may stop receiving and installing software updates. The lack of such updates can negatively affect the health of the computing device. Because the health of the device changed after passing the network admission criteria, absent real-time monitoring the device would both remain in an unhealthy state and remain connected to the network for possibly a dangerously long period of time. Indeed, even if devices were configured to voluntarily have their health checked on a periodic basis, the device could remain in an unhealthy state until its next checkup, potentially exposing the device, and the network, to malicious software.

In one embodiment, a network state database can comprise the network-centric state of one or more of the computing devices participating in the network. Such a network state database can comprise either a single database storing relevant information, or it can comprise the collection of relevant information as individually maintained by one or more computing devices. The network-centric state of any computing device can be specific to the security requirements and settings established by a network administrator. For example, in one network, it may be important to ensure that each computing device has properly updated its software and, consequently, the network-centric state of a computing device in such a network can comprise the update status of the installed software. Similarly, in another network, it may be important to ensure that each computing device has a firewall turned on and, therefore, the network-centric state of a computing device in such a network can comprise the status of the computing device's firewall. In an alternative embodiment, the network state database can comprise as much information as possible regarding the computing devices participating in the network, thereby enabling the database to track the network-centric state of one or more computing device even if the categories of information that comprise the network-centric state of a computing device are expanded or otherwise changed.

The network state database can be dynamically updated to provide a real-time network-centric state of one or more computing devices on the network. In one embodiment, such updates can be provided to the network state database automatically when detected by whatever process would traditionally monitor the relevant aspect of the computing device. Such processes can be considered "publishers" of the information contained within the network state database. For example, the availability and installation of software updates is often managed by the operating system of a computing device. Consequently, the operating system can be a publisher of information to the network state database, and can notify the network state database whenever the operating system detects an event critical to the installation of updates, such as, for example, the user selecting to stop installing updates and a new update become available, thereby making the device not up-to-date. In another embodiment, the network state database need not comprise a centralized information repository, and can be merely the conceptual amalgamation of information as typically maintained. Thus, in such an embodiment, the mere storing, by the operating system, of the user's selection to stop installing updates, can be considered to be an update of the network state database.

In another embodiment, a network risk management service can interact with the network state database and can initiate responses to changes in the network state database. Such responses can conform to predetermined network policies, such as would be established by a network administrator. The network risk management service can further perform functions to provide for the dynamic updating of the network state database, such as, for example, the active collection of information from sources that are not sufficiently sophisticated to become publishers of information to the network state database.

In one embodiment, the network risk management service can provide information regarding changes in the network state of a computing device to one or more computing devices or processes, each of which can be considered to be a "subscriber" of such notifications. Subscribers can request the provided information for any of a variety of reasons, including the implementing of network policies. Thus, in such a case, the network risk management service can indirectly respond to changes in the network state of a computing device by notifying a subscriber of the change and, thereby, triggering an appropriate response by the subscriber. For example, if a computing device's state was changed to reflect that it was not installing software updates, and if the appropriate response to such a change in state would be to remove the computing device from the network, the network risk management service can merely provide information regarding the changed state to a subscriber, such as a DHCP server, and the DHCP server can itself remove the offending computing device from the network by invalidating the network address leased to the computing device by the DHCP server.

In another embodiment, the network risk management service can itself directly perform appropriate actions in response to a change in the network state of a computing device as reflected by the network state database. Thus, rather than providing network state updates to one or more subscribers, the network risk management service can itself evaluate the changed network state and can determine an appropriate response. The network risk management service can, subsequently, implement such a response by instructing one or more network devices. For example, if a computing device's state was changed to reflect that it was not installing software updates, and if the appropriate response to such a change in state would be to remove the computing device from the network, the network risk management service can itself instruct an appropriate network device, such as an wire-based network switch, or a wireless network router, to disconnect the offending computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to mechanisms for obtaining, storing, monitoring and responding to the network-centric state of one or more computing devices that are members of a network. The information comprising the network state of a computing device can be relevant to one or more security policies established by an administrator of the network. In one embodiment, a network state database can act as a central repository obtaining information, either actively or passively, from computing devices regarding aspects of the hardware, software, and network connectivity aspects of such computing devices that are relevant to the network state of those computing devices. In an alternative embodiment, the information regarding aspects of the hardware, software, and network connectivity of computing devices that are relevant to the network state of those computing devices can be maintained on an individual basis by mechanisms that would traditionally maintain such information, and the network state database can simply be a conceptual amalgamation of such information as stored throughout the network.

In another embodiment, the network state database can be associated with a network risk management service that can monitor the network state database and provide information regarding changes to the network state of a computing device to one or more subscribers of such notifications. In an alternative embodiment, the network risk management service can, based on a security policy established by a network administrator, select appropriate responses to changes to the network state of a computing device whose network state is contained in the network state database. In a further embodiment, the appropriate response selected by the network risk management service can be implemented by the service itself via communications with one or more network devices or other infrastructure components. In a still further embodiment, the network risk management service can operate on behalf of the network state database, and can acquire information for the network state database.

The techniques described herein focus on, but are not limited to, the interaction of the network state database and the network risk management service with existing network hardware and software. Thus, while specific elements of network hardware or software may be referenced in examples provided to for illustrative purposes only, such specific elements are not in any way meant to be described as necessary or required components. Indeed, the mechanisms described herein are equally applicable to any network hardware or software that can meaningfully communicate with the network state database and the network risk management service, and can meaningfully receive and respond to requests and information from the network risk management service.

Figure 1:
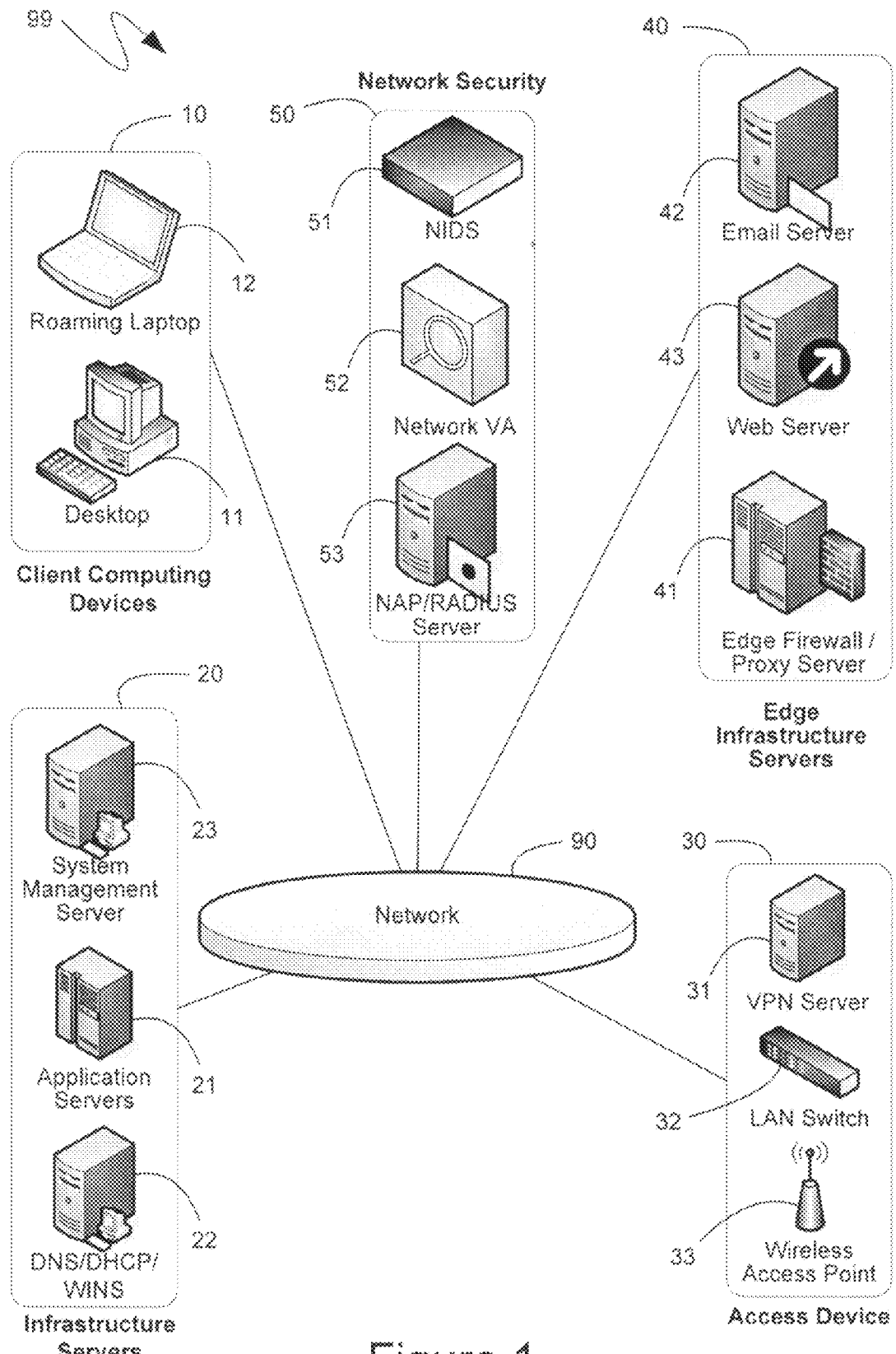
FIG. 1 is a block diagram of an exemplary network comprising multiple interconnected devices.

Turning to FIG. 1, an exemplary network system 99 is illustrated comprising the network 90 itself, and further comprising network client computing devices 10, network infrastructure servers 20, network access devices 30, network edge infrastructure servers 40, and network security servers 50. While the network client computing devices 10 are illustrated as comprising only a desktop computing device 11 and a roaming laptop computing device 12, nothing about the present mechanisms is limited to only those types of network computing devices. Thus, while limited for simplicity of illustration, the network computing device 10 can comprise hand-held computing devices, personal digital assistants, and any other computing device that can connect to the network 90 as a client.

Connection to the network 90 can be assisted via infrastructure servers 20. The infrastructure servers 20 can include application servers 21 that can host one or more application programs that can be accessed and utilized from the client computing devices 10 over the network 90. The infrastructure servers 20 can also include servers that provide network addresses and other connectivity information to the client computing devices 10, such as Domain Name Service (DNS), Dynamic Host Configuration Protocol (DHCP), or Windows Internet Name Service (WINS) servers 22. The infrastructure servers 20 can further include system management servers 23, which can provide, to the administrators of the network 90, the ability to monitor the various computing devices of the network, install software on those computing devices, and otherwise manage the network. The infrastructure servers 20 can further include other servers not shown in the figure such as Active Directory, and Microsoft Operations Manager that are responsible for storing configuration and operational state respectively of a device.

Physically, the client computing devices 10 can connect to the network 90 via access devices 30, which can include wired network access components, such as a LAN switch or router 32, wireless network access components, such as a wireless access point (WAP) 33 and other network access devices, such as a Virtual Private Network (VPN) server 31, which can enable remote client computing devices 10, such as the roaming laptop 12, to connect to the network 90 through otherwise unsecured networks, such as the Internet.

The client computing devices 10 can share information with computing devices that are not part of the network 90 through the edge infrastructure servers 40. Edge infrastructure servers 40 can include an email server 42 that can enables the client computing devices 10 to both send email messages and attachments to other computing devices that are not part of the network 90 and to receive email messages and attachments from those other computing devices. Edge infrastructure servers 40 can also include a web server 43 for enabling the client computing devices 10, among others, to host information for access through the World Wide Web. Edge infrastructure servers 40 can further include servers designed to protect the resources of the network 90, both from external sources that have not been properly granted access to such resources, and from internal sources who may be seeking to transmit sensitive information out of the network 90. Such servers can include firewall and proxy servers 41, which can block specific content or communication channels, and can otherwise search and filter both incoming and outgoing data.

In addition to the mechanisms described below, the network 90 can also include more traditional forms of network security 50. The network security 50 can include a Network Intrusion Detection Server (NDIS) 51 which can perform a number of monitoring services, including monitor data transmissions into and out of the network 90 looking for suspicious activity, scanning various files looking for unauthorized activity, such as scanning server log files looking for suspicious traffic or usage patterns that match a typical network infiltration or a typical attempted intrusion, and detecting changes in various server components. The network security 50 can also include a network Vulnerability Assessment (VA) server 52 that can scan one or more of the client computing devices 10, as well as the other computing devices of the network 90, and thereby monitor the status of the mechanisms present on those computing devices that reduce their vulnerability, such as firewall processes, anti-malware software, and automatic software updating mechanisms. The network security 50 can further include a Network Access Protection (NAP) server that can enable an administrator of the network 90 to establish minimum standards, especially regarding the health and vulnerability of a computing device, that must be met by any computing device seeking access to the network 90. Computing devices seeking to connect to the network 90 can initially be reviewed by a NAP server, RADIUS server or similar server, generically referred to herein as a "NAP server" and generally represented by the NAP/RADIUS server 53. Those computing devices not meeting the established standards can be denied access to the network by the NAP server.

Although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing devices, as the mechanisms may also be practiced in distributed computing environments where tasks are performed by remote processing devices that are linked through a communications network. In a distributed computing environment, program modules may be located in both local and remote memory storage devices.

Figure 2:
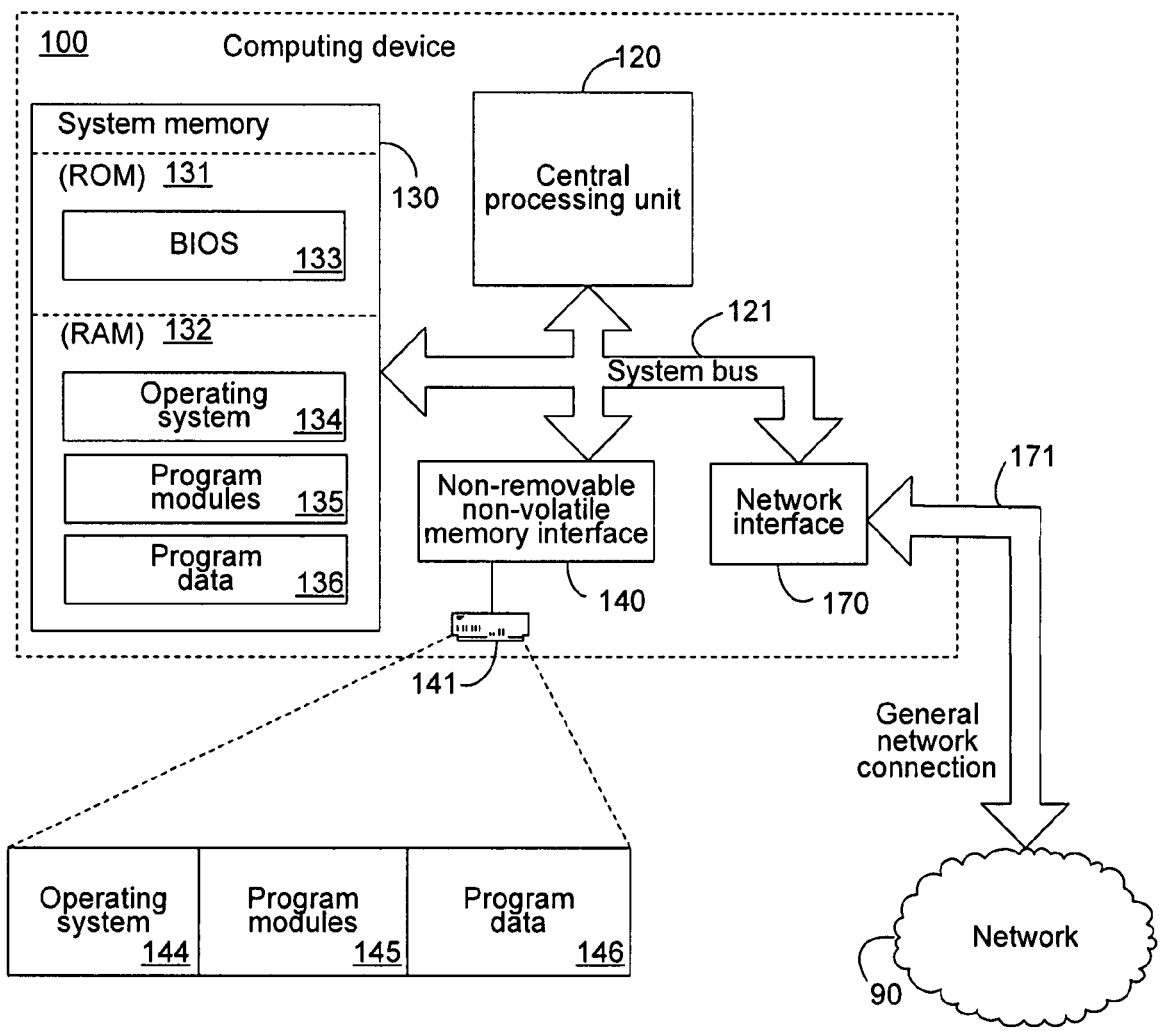
FIG. 2 is a block diagram of an exemplary computing device.

With reference to FIG. 2, an exemplary computing device 100 is illustrated. The computing device 100 can represent any of the computing devices 11, 12, 21, 22, 23, 31, 32, 33, 41, 42, 43, 51, 52 and 53 of FIG. 1. The exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 2 illustrates an operating system 134, other program modules 135, and program data 136.

The computing device 100 may also include other removable/non-removable, volatile/nonvolatile computer storage media. By way of example only, FIG. 2 illustrates a hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing an operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

Of relevance to the descriptions below, the computing device 100 may operate in a networked environment using logical connections to one or more remote computers. For simplicity of illustration, the computing device 100 is shown in FIG. 2 to be connected to a network 90 that is not limited to any particular network or networking protocols. The logical connection depicted in FIG. 2 is a general network connection 171 that can be a local area network (LAN), a wide area network (WAN) or other network. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Figure 3:
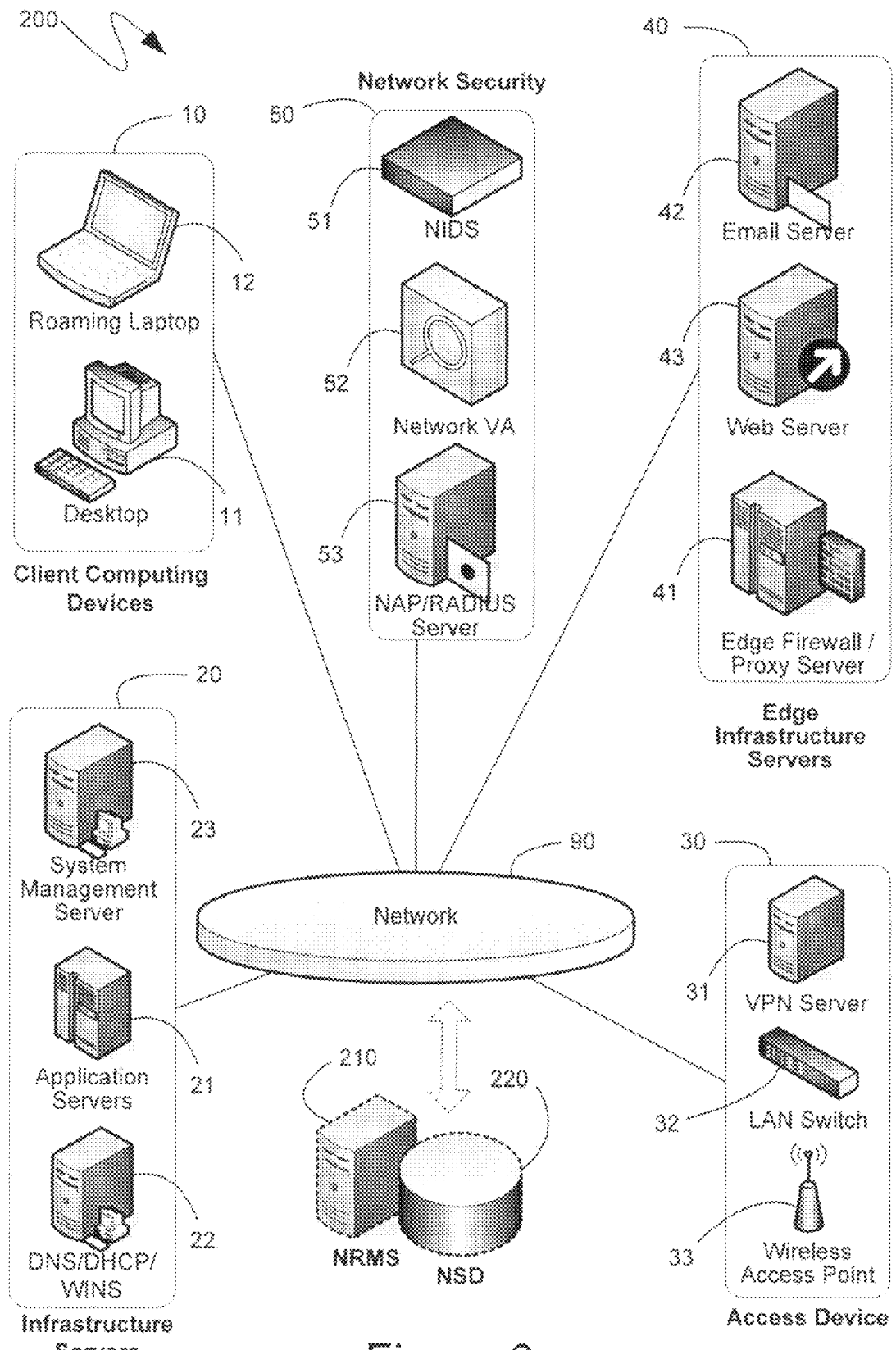
FIG. 3 is a block diagram of an exemplary network comprising mechanisms associated with the network state of one or more devices.

To provide real-time protection to both a network, such as the network 90 of FIG. 1, and to individual computing devices connected to the network 90, such as computing devices generally similar to the exemplary computing device 100 of FIG. 2, a Network State Database (NSD) and a Network Risk Management Service (NRMS) can be provided and communicatively interconnected with existing elements and devices of the network 90. Turning to FIG. 3, an NRMS 210 and NSD 220 are illustrated communicatively connected to the network 90 and, thereby to the other computing devices 11, 12, 21, 22, 23, 31, 32, 33, 41, 42, 43, 51, 52 and 53 shown as members of the network 90. While both the NRMS 210 and the NSD 220 are illustrated as independent entities in FIG. 3, they can be co-located with other services on any one or more of the computing devices illustrated in FIG. 3. Thus, for example, both the NRMS 210 and the NSD 220 can be hosted by the same server computing device 53 that is hosting the NAP server, RADIUS server or other server with similar functionality.

The NSD 220 can, in one embodiment, receive information regarding the network-centric state of either the client computing devices 10 or all of the computing devices connected to the network 90. For example, the NSD 220 can inform the network security servers 50 of its presence and can request that the network security servers provide updates to the NSD when they become aware of them. The NSD 220 can likewise inform the edge infrastructure servers 40 of its presence and request that specific information be provided to the NSD when the edge infrastructure servers become aware of that information. In one embodiment, there can be a well-known set of interfaces defined between NDS and other servers. Alternatively, the NDS can integrate with other servers through their proprietary published interfaces. The precise mechanisms, as will be recognized by those skilled in the art, can be implementation-dependent and device-dependent. Ultimately, however, in each case, a server that agrees to provide information to the NSD 220 can be referred to as a "publisher" of information to the NSD.

As an example of the publishing of information to the NSD 220, when a computing device, attempting to join the network 90, is validated by the NAP server 53, the NAP server can provide relevant information regarding the device's ability to pass the network admission criteria to the NSD. Thus, if the desktop client computing device 11 attempted to join the network 90, via, for example, a connection through the LAN switch 32, the desktop 11 could initially communicate with the NAP server 53 to enable the NAP server an opportunity to examine the desktop and verify that it meets the network admission criteria. For example, the NAP server 53 could check if the desktop 11 includes a current anti-malware program, if the desktop is configured to automatically apply software upgrades, or if the desktop is executing firewall software. Assuming the desktop 11 meets the relevant network admission criteria, the NAP server 53 can enable the desktop to join the network 90 and can provide, to the NSD 220 the information about the desktop 11 that the NAP server learned, including, for example, the state of any anti-malware software installed on the desktop 11, the state of the automatic software updating on the desktop 11, and the state of any firewall applications on the desktop 11.

The information received by the NSD 220 can be stored in a conventional relational database or any other storage structure that enables the NSD 220 to associate relevant information with the computing device to which it corresponds. Additionally, the storage of network-centric state information in the NSD can be in a format that can accommodate the provision of additional relevant information, including information that may not conform to predefined categories. For example, one of the edge infrastructure servers 40, such as the email server 42, may detect behavior by the desktop 11 that violates network policies, or otherwise suggests that the desktop 11 may have been compromised by malicious software. Thus, if the email server 42 detects an unusually large volume of email being sent by the desktop 11, it can notify the NSD 220, thereby enabling the NSD to log such an event. Similarly, if the NIDS server 51 detects suspicious communications between the desktop 11 and other computing devices on the network 90, such as the accessing of a large number of files within a very short time frame, it to can notify the NSD 220 and enable the NSD to record the findings of the NIDS server 51.

The NSD 220 can further maintain the network-centric state information received and can update the information when appropriate. For example, while the NAP server 53 may have determined that the desktop 11 was configured to automatically install software updates when the NAP server validated the desktop for connection to the network 90, a subsequent scan of the desktop 11 by the network VA server 52 may reveal that, subsequent to joining the network 90, the desktop 11 has had the automatic installation of software updates disabled. Such a determination by the network VA server 52 can be communicated to the NSD 220, which can appropriately replace the previously received information regarding the status of automatic software updating on the desktop 11.

In an alternative embodiment, rather than being a collection of information as described above, the NSD 220 can represent a conceptual amalgamation of diversely maintained information that represents the network-centric state of one or more computing devices, such as the client computing devices 10. Thus, rather than accessing a physical database, the NRMS 210 can obtain the same information that would have been stored in such a database from appropriate computing devices themselves. For example, the NSD 220 can still comprise information regarding the desktop 11 that has been collected by the email server 42, such as an indication that the desktop is behaving unusually by sending a large volume of email, except that such information can reside at the email server 42, or other appropriate network location, and can be accessed from there by the NRMS 210. Similarly, the NRMS 210 can obtain the information regarding suspicious network traffic, described above, directly from the NIDS server 51 and the information regarding automatic software updating, also described above, directly from the network VA server 52. The NSD 220, in such an embodiment, can be nothing more than a conceptual collection of information. In this model, the NSD 220 can comprise a collection of pointers, either to the network-centric state information itself, or to procedures by which the NRMS 210 could obtain such information from the relevant computing devices maintaining that information.

In a still further embodiment, the NSD 220 can, either via dedicated mechanisms, or with the help of the NRMS 210, actively poll one or more sources for such information and retrieve such information from those sources, if appropriate. Such polling can be in the place of the passive receipt of information described above, or it can be in addition to it. For example, information received from a computing device to which the NSD 220 has subscribed can be supplemented by additional information obtained in response to a specific request by the NSD 220 for such additional information. In one embodiment, such an additional request can be based on, or triggered by, the initially received information.

For computing devices that are not sufficiently sophisticated to enable the NSD 220 to subscribe for updates, the NSD 220 can periodically poll such computing devices to determine if any new information has been obtained by them. For example, the NSD 220 can poll, either periodically, or in response to a triggering event, the NIDS server 51, or the email server 42, and inquire whether they have flagged any unusual, or possibly malicious, activity. If either responds affirmatively, the NSD 220 can request further information, such as an identifier of the computing device sourcing the unusual activity, the time when the unusual activity was detected, and the nature of the unusual activity, such as a large volume of emails to a wide variety of recipients, or a large number of file accesses within a very short period of time. The NSD 220 can subsequently store the acquired information as it would have if the information was obtained automatically, rather than by polling. Additionally, the polling frequency can be tailored to both the available network bandwidth and to the information being polled. Thus, any polling performed by the NSD 220 can be reduced during times of increased traffic on the network 90. Similarly, a state that does not change frequently can be polled less often than a state that varies frequently.

Once network-centric state information has been added to the NSD 220, it can be distributed to other computing devices or used to evaluate the computing devices of the network 90. In one embodiment, the NSD 220 provides for subscribers, much like the publishers described above, who can automatically receive relevant information from the NSD 220. Such subscribers can be provided the relevant information by the NRMS 210, which can further parse the information contained in the NSD 220 and identify the relevant information for each subscriber. For example, the NAP server 53 can be a subscriber of information from the NSD 220, in which case the NRMS 210 could parse the NSD and identify only the information that impacted one or more of the criteria for network admission used by the NAP server. For example, the NRMS 210 could ignore, for purposes of identifying information to provide to the NAP server 53, indications that a computing device is sending too much email or accessing too many files, even though such information may be present in the NSD 220, since such information may not be relevant to the NAP server. However, if the NSD 220 comprises information regarding, for example, the deactivation of anti-malware software installed on a computing device, such information, because it is relevant to the network admission criteria applied by the NAP server 53, can be identified by the NRMS 210 and can be automatically provided, by the NRMS, to the NAP server 53.

The subscribers of the NRMS 210 can use the information from the NSD, provided by the NRMS, to render decisions regarding the computing devices on the network 90. For example, if the NAP server 53 acted as a subscriber of the NRMS 210, then, upon receiving a notification, such as an indication that the desktop 11 has deactivated its anti-malware software, the NAP server could determine that the desktop 11 no longer meets the admission criteria of the network 90, and can attempt to disconnect the desktop 11 from the network 90 by placing the certificate associated with the desktop 11 on a certificate revocation list. It may do this with the help of a certificate authority server. If device access is implemented using certificates, any subsequent connections the desktop 11 seeks to form with other computing devices that are part of the network 90, where the formation of such a connection requires the desktop 11 to provide a certificate, will fail because the other computing device will not accept the desktop's certificate, as it is on the certificate revocation list.

The NRMS 210 can similarly seek to remove from the network 90 those computing devices that either do not meet the network admission criteria, or are otherwise suspected of having been compromised by malicious software. In one embodiment, the NRMS 210 can supplement the actions of a gatekeeper, such as the NAP server 53, by more broadly enforcing a disconnection of a computing device from the network 90. For example, the placing, by the NAP server 53, of a computing device's certificate on a certificate revocation list only affects future connections attempted by that computing device. Already existing connections may not be terminated until a reason arises for which the computing device's certificate needs to be re-authenticated to maintain the connection.

The NRMS 210, therefore, can supplement the action of the NAP server 53 by providing the information that the NAP server has placed a computing device's certificate on the certificate revocation list to multiple subscribers, enabling those subscribers to more immediately terminate any connection between that computing device and the network 90. For example, if the NAP server 53 had, placed the certificate of the desktop 11 on the certificate revocation list, such an action can be communicated to the NSD 220, or otherwise obtained by the NSD and stored therein. Subsequently, the NRMS 210 can notify its subscribers of the action by the NAP server 53. Such subscribers can include the edge firewall 41 and the email server 42. In response, the edge firewall 41 can refuse inbound communications destined for the desktop 11 and outbound communications originating from it, and the email server 42 can likewise refuse inbound email addressed to the desktop 11 and outbound email being sent from it. Another subscriber of the notifications of the NRMS 210 can be the DHCP server 22 which, in response to a notification from the NRMS that the NAP server 53 has placed the certificate of the desktop 11 on the certificate revocation list, can invalidate the network address leased by the DHCP server 22 to the desktop 11, thereby requiring the desktop to attempt to reconnect to the network 90. Should the desktop 11 attempt such a reconnection, the NAP server 53 could refuse to allow it to reconnect to the network 90. Therefore, the notifications by the NRMS 210 can supplement actions by other computing devices, such as the NAP server 53, in removing undesirable computing devices from the network 90.

In another embodiment, the NRMS 210 need not require a decision by another computing device, such as the NAP server 53, to decide that a computing device connected to the network 90 is undesirable and should be removed. Instead, the NRMS 210 can itself comprise mechanisms for analyzing the information contained in the NSD 220 and independently determining that a computing device connected to the network 90 should be dealt with. For computing devices that the NRMS 210 deems to be malicious or otherwise compromised, it can attempt to remove such computing devices from the network 90, such as in the manner described above. However, the response of the NRMS 210 is not so limited. The NRMS 210, for example, can also determine that a computing device is at risk, but is not yet compromised, and can instruct the NIDS server 51 to monitor such a computing device more closely.

Decisions made by the NRMS 210 can be based on multiple sources of information collected by the NSD 220. Specifically, the NRMS 210 can "double-check" information to verify that such information was not misleading or maliciously sent. For example, if the email server 42 becomes infected, it could maliciously notify the NRMS 210 and the NSD 220 that a computing device is sending a lot of emails. However, the NIDS server 51, that can also monitor suspicious network behavior, may not have detected any such email surge. Consequently, by comparing an aspect of the network-centric state of a computing device as reported by one source with the same aspect as reported by another source, the NRMS 210 can both base its decisions on more reliable information, and can further identify potentially infected computing devices. For example, in the example just provided, the NRMS 210 could conclude, based on the discrepancy between the information provided by the NIDS server 51 and that provided by the email server 42, that at least one of these computing devices is behaving in an unusual manner.

As indicated previously, the NRMS 210 can provide notifications to subscriber computing devices of events relevant to those subscribers. Thus, as illustrated in the prior example above, if the NSD 220 receives, or otherwise obtains, information that the NAP server 53 has placed a computing device's certificate on the certificate revocation list, the NRMS 210 can provide such information to its subscribers. The NRMS 210 can similarly provide information to its subscribers when the NRMS itself independently reaches a conclusion regarding a computing device, based on the information in the NSD 220, which may be relevant to one or more of the subscribers.

In another embodiment, however, the NRMS 210, instead of merely providing information, can directly instruct one or more computing devices connected to the network 90 to accomplish a particular goal, such as removing an undesirable computing device from the network 90. For example, if the NRMS 210 determines that the laptop 12 has become infected with malicious software, it can directly remove the laptop 12 from the network 90 by, for example, instructing the wireless access point 33, through which the laptop 12 connects to the network, to disconnect the laptop. In such a manner, even though the wireless access point 33 may not have sufficient computational abilities to determine when to disconnect a client based merely on information provided by the NRMS, it will almost certainly have sufficient computational abilities to receive simple instructions, such as the instruction from the NRMS to disconnect a client, and to implement such instructions. Additionally, direct instructions from the NRMS 210 to various computing devices can be supplemented with information to other computing devices. Thus, in addition to, for example, instructing the wireless access point 33 to disconnect the laptop 12, the NRMS 210 can further inform the NAP server 53, or the DHCP/DNS server 22, of its decision to disconnect the laptop, thereby enabling the NAP server and DHCP/DNS server to further isolate the laptop 12, such as by refusing new connection requests from the laptop 12 that it may make in an attempt to reconnect to the network 90 after being disconnected by the wireless access point 33.

Because the NRMS 210 can independently initiate responsive actions, such as the removal of a computing device from the network 90, the NRMS, in combination with the NSD 220, can be used not only to protect against known malicious software or actions for which defenses are known and available, but the NRMS and the NSD can likewise be used to protect against either known maliciousness for which no defense, short of disconnection from the network 90, has yet been developed, and even to protect against unknown maliciousness. FIGS. 4 through 7 illustrate exemplary flowcharts describing the functionality of the NRMS 210 and the NSD 220 in responding to both known and unknown malicious code or other undesirable actions.

Figure 4:
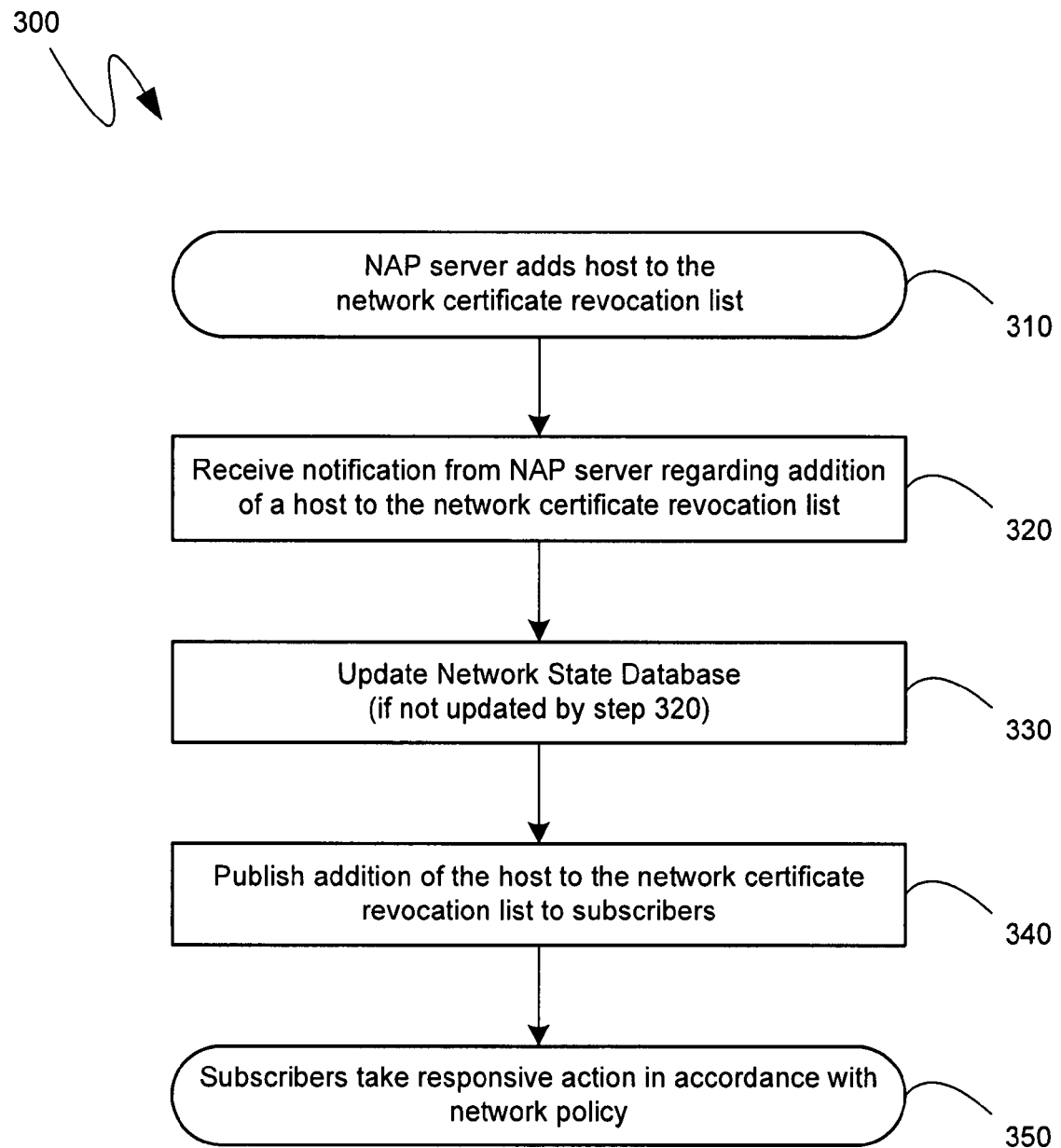
FIG. 4 is flow diagram of exemplary steps associated with a change in the network state of a device.

Turning to FIG. 4, a flowchart 300 illustrates the behavior of the NRMS 210 and the NSD 220 in responding to a known vulnerability detected by another computing device of the network 90. In the example illustrated by flowchart 300, such other computing device is the NAP server 53. Initially, as illustrated by step 310, the NAP server 53 can, for any number of reasons, including information received from the NRMS 210 in the manner described above, add a computing device, termed the "host" in flowchart 300, to the network certificate revocation list.

In response to such an action by the NAP server 53, the NRMS 210 can receive a notification initiated by the NAP server regarding the addition of the host to the network certificate revocation list at step 320. In one embodiment, step 320 can comprise a direct communication from the NAP server 53 to the NRMS 210, while in an alternative embodiment, step 320 can comprise an indirect communication that initially proceeds from the NAP server 53 to the NSD 220, providing the NSD the opportunity to update the relevant information and, thereby notify the NRMS 210. If the NRMS 210 received the information in step 320 directly from the NAP server 53, then, at step 330, the NRMS 210 can ensure that the NSD 220 is appropriately updated.

Subsequently, at step 340, the NRMS 210 can publish, to its subscribers for whom the information would be relevant, or simply to all of the subscribers, the decision of the NAP server 53 to add the host to the network certificate revocation list. Upon receipt of such information from the NRMS 210, the subscribers could then each individually take a responsive action at step 350. For example, as described above, each subscriber could cease communications with the host that was added to the network certificate revocation list.

While flowchart 300 focuses on the addition of a host to a certificate revocation list, the steps performed by the NRMS 210, namely steps 320 through 340, remain unchanged irrespective of the triggering event or action that occurs at step 310. Thus, the flowchart 300 describes the operation of the NRMS 210 for any type of triggering event or action at step 310.

Figure 5:
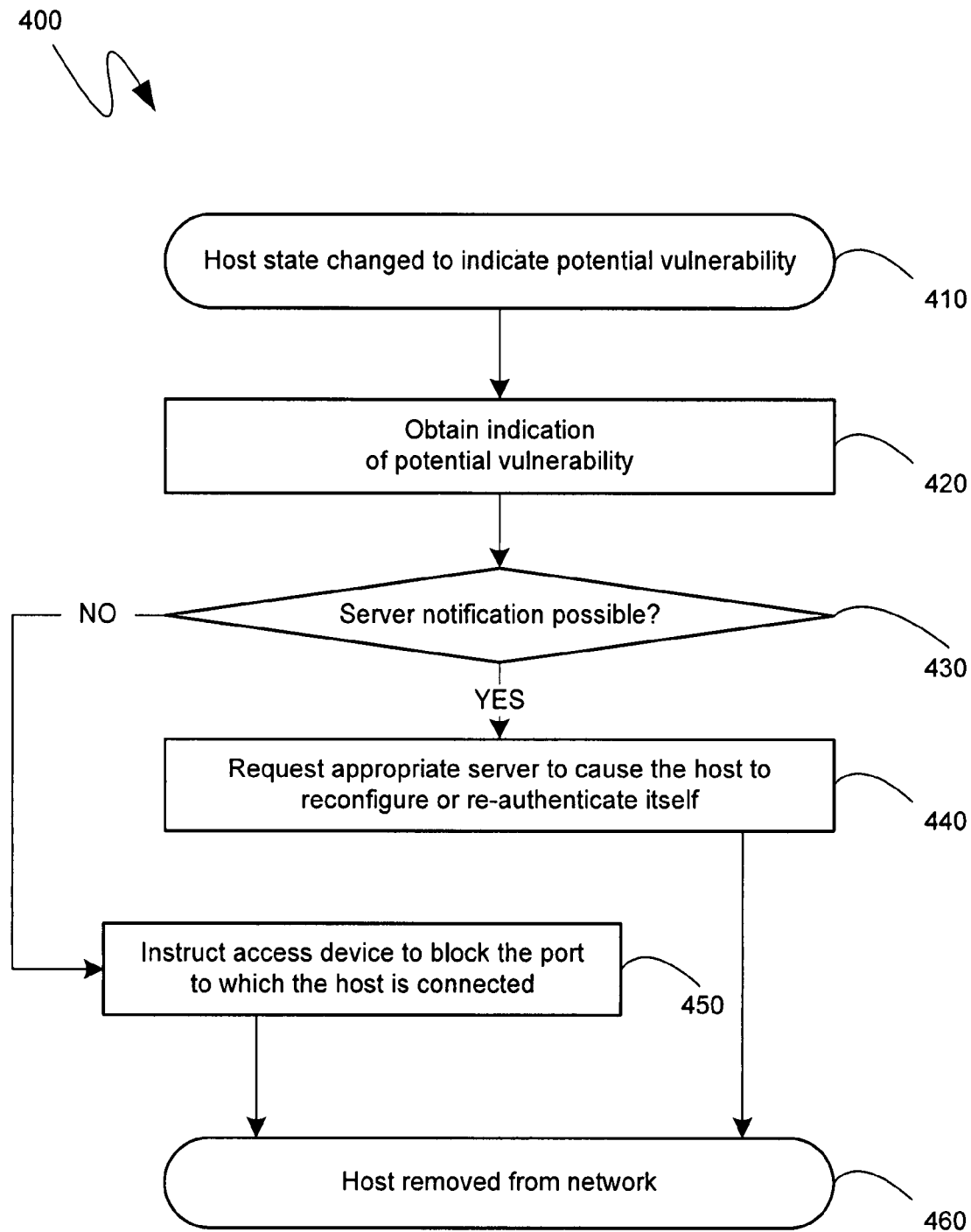
FIG. 5 is flow diagram of another set of exemplary steps associated with a change in the network state of a device.

As indicated previously, the NRMS 210 can itself select an appropriate action in response to the data contained in the NSD 220. Turning to FIG. 5, a flowchart 400 illustrates an exemplary series of steps showing the operation of the NRMS 210 in independently assessing a situation and responding to it. An event can occur at step 410 that can ultimately result in a responsive action by the NRMS 210. In the example illustrated by flowchart 400, such an action can be the changing of a network-centric state of a computing device, referred to as a "host" by flowchart 400, to indicate a potential vulnerability. Such a change, as indicated previously, can include the sending of an unusually large number of emails, or the accessing of an unusually large number of files within a short period of time. Such a change, as also indicated previously, can include the deactivation of relevant mechanisms on the host, such as the deactivation of anti-malware software, or automatic software updating mechanisms.

While illustrated as such for exemplary purposes, the triggering event of step 410 need not be directed due to a vulnerability of the host. For example, an equally applicable triggering event that could occur at step 410 would be the discovery, by the host, of a wireless access point that is a rogue access point. In such a case, it would be the network-centric state of another device on the network 90, such as the wireless access point 33, that would be associated with the triggering step 410.

The NRMS 210 can become aware of the triggering event at step 420. In one embodiment, step 420 contemplates the polling, or otherwise monitoring, a host by a dedicated computing device, such as the NIDS server 51 or the email server 42, coupled with the transmission of information detected by such a dedicated computing device to the NSD 220. In such an embodiment, the NRMS 210 can become aware of a change in the host's state when the NSD 220 is updated with the received information. In an alternative embodiment, however, step 420 contemplates that the NRMS 210 can itself periodically, or based on some other trigger, poll the host, or poll monitoring devices such as the NIDS server 51 or the email server 42, and thereby obtain the information regarding the change in the host's state from step 410.

If step 420 contemplates polling, there can be overhead and scalability issues if there is a large population of hosts. In one embodiment, this can be mitigated by having multiple NIDS servers that maintain a consolidated state between them, where the consolidated state can be examined by each NIDS server. In an alternative embodiment, NIDS 51 can monitor a consolidated event log of all hosts, where each host sends events of interest to a central server that can filter and aggregate those events into the consolidated event log. This central server can be the same server that is hosting the NSD 220 or it can be another server.

In a still further alternative embodiment, step 420, rather than relying on the polling of a host by some external server or process, contemplates the existence of monitoring software on the host itself that can proactively inform the NRMS 210 of a change in the state of the host that creates a potential vulnerability, or otherwise proactively inform the NRMS 210 of information, discovered by the host, regarding some other device on the network 90. For example, as indicated previously, the operating system of the host can inform the NRMS 210 if, among other things, the automatic obtaining of updated software has been disabled.

In response to the change in the host's state, or the notification of relevant information regarding another network device, the NRMS 210 can determine an appropriate course of action at step 430. In one embodiment, at step 430, the NRMS 210 can determine if server notification is possible. If server notification is possible, then, at step 440, the NRMS 210 can direct one or more requests to appropriate servers to perform actions designed to minimize risk to the network 90. For example, in the illustrated step 440, the appropriate course of action comprises a request that one or more server computing devices instruct the host to reconfigure or re-authenticate itself. Such a request can be directed to server computing devices, such as the DHCP server 22, NAP server 53, or another appropriate server computing device such as the RADIUS server, 53. Such server computing devices can, in turn, trigger a switch or a access point to cause the host to re-authenticate itself. If an appropriate server computing device cannot be notified at step 440, such as, for example, if the relevant host is connecting through a physical switch i.e. an access device that does not recognize the instruction of step 440 from a server, the switch itself, or other access device, can be instructed, at step 450, to disconnect and block the port to which the host is connected. Thus, for example, the NRMS 210 could instruct one or more of the access devices 30 to simply terminate the connection between the relevant host and the network 90. Such a termination can result in the host's removal from the network 90, as represented by step 460. In an alternative embodiment, step 460 can be accomplished in response to step 430 by the server computing device notified at step 430. In such an embodiment, an appropriate server would have been notified at step 440, thereby skipping step 450.

Again, as indicated previously, the NRMS 210 can select from a wide range of potentially responsive actions, and is not limited to requesting host disconnection from the network 90. For example, the NRMS 210 could respond to information regarding a change in the host's network-centric state by requesting further observation of that host. In such a case, the actions performed by, for example, step 440, can request further observation, rather than re-authentication. Thus, flowchart 400 can represent generic classes of actions which are applicable to a range of responsive actions by the NRMS 210.

Figure 6:
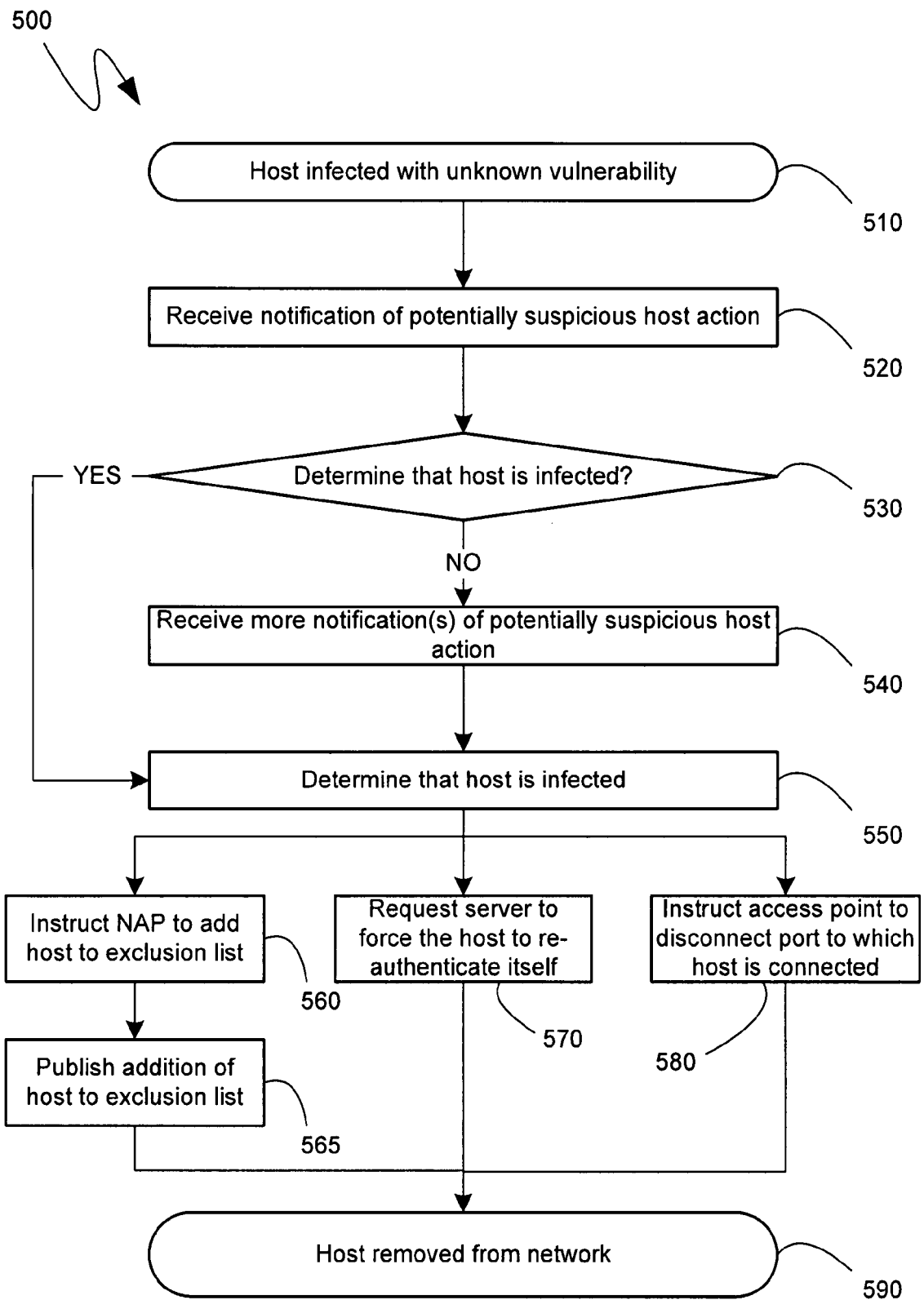
FIG. 6 is flow diagram of exemplary steps associated with a change in the network state of a device triggered by an unknown vulnerability.

While existing mechanisms, such as the NIDS server 51 or the email server 42, can be directed to detect and respond to known threats and vulnerabilities, the NRMS 210 and NSD 220 can further provide protection against unknown vulnerabilities via the observation of suspicious behavior and a subsequent reaction that can occur in an agile and effective manner. FIG. 6 illustrates a flowchart 500 showing one example of the agility of the NRMS 210 and the NSD 220 in response to an unknown vulnerability. Initially, as shown by step 510, a host can become infected with an unknown vulnerability. Subsequently, the NRMS 210 can receive notification of potentially suspicious behavior by the host, or it can receive notification of a state change, which can be considered to be a sensitive state change, such as, for example, a new program being added to automatically start at boot time. In one embodiment, step 520 contemplates receiving the notification from a dedicated computing device, such as the NIDS server 51 or the email server 42, by having such a dedicated computing device collect relevant information and transmit it to the NSD 220. In such an embodiment, the NRMS 210 can receive the notification of step 520 when the NSD 220 is updated with the received information. In an alternative embodiment, however, step 520 contemplates that the NRMS 210 can itself periodically, or based on some other trigger, monitor hosts and thereby receive a notification of potentially suspicious behavior at step 520. In a still further embodiment, step 520 contemplates a proactive notification from a component on the host itself. For example, as indicated previously, the host's operating system can act as a publisher, notifying the NRMS 210 of relevant changes to the network-centric state of the host. As indicated previously, the information relevant to the network-centric state of the host, and thus the information that can be communicated to the NRMS 210, can be policy driven. In addition, the frequency with which notifications are provided to the NRMS 210 can further be policy driven.

While a single notification of potentially suspicious behavior, such as that received at step 520, may be sufficient for the NRMS 210 to determine that remedial action should be taken, another embodiment contemplates that the NRMS 210 may decide to wait for further information before determining a responsive action. In such an embodiment, rather than determining that the host is infected at step 530, the NRMS 210 can wait for additional information, such as that received at step 540, which can mirror the possibilities described above with respect to step 520. If the NRMS 210 determines, at step 550, that the host is infected with a heretofore unknown vulnerability, the NRMS can respond accordingly. Flowchart 500 illustrates the options described above, in connection with various embodiments, for removing the infected host from the network 90 if the NRMS 210 determines that removal is the proper course of action. Thus, in one embodiment, at step 540, the NRMS 210 can request that the NAP server 53 add the host to the network exclusion list and, subsequently, at step 565, the NRMS can publish such an action on the part of the NAP server to the subscribers in an analogous manner to that described in detail above. In an alternative embodiment, at step 570, the NRMS 210 can request appropriate servers, such as the DHCP server 22 or RADIUS server 53, to force the host to re-configure or re-authenticate itself respectively. In a still further alternative embodiment, at step 580, the NRMS 210 can directly itself instruct appropriate access devices 30 to terminate the connection between the host and the network 90 and block further communication to/from the host. In any of these embodiments, the ultimate step 590 can result in the removal of the suspicious host from the network 90, thereby protecting the network 90 from an unknown vulnerability.

Figure 7:
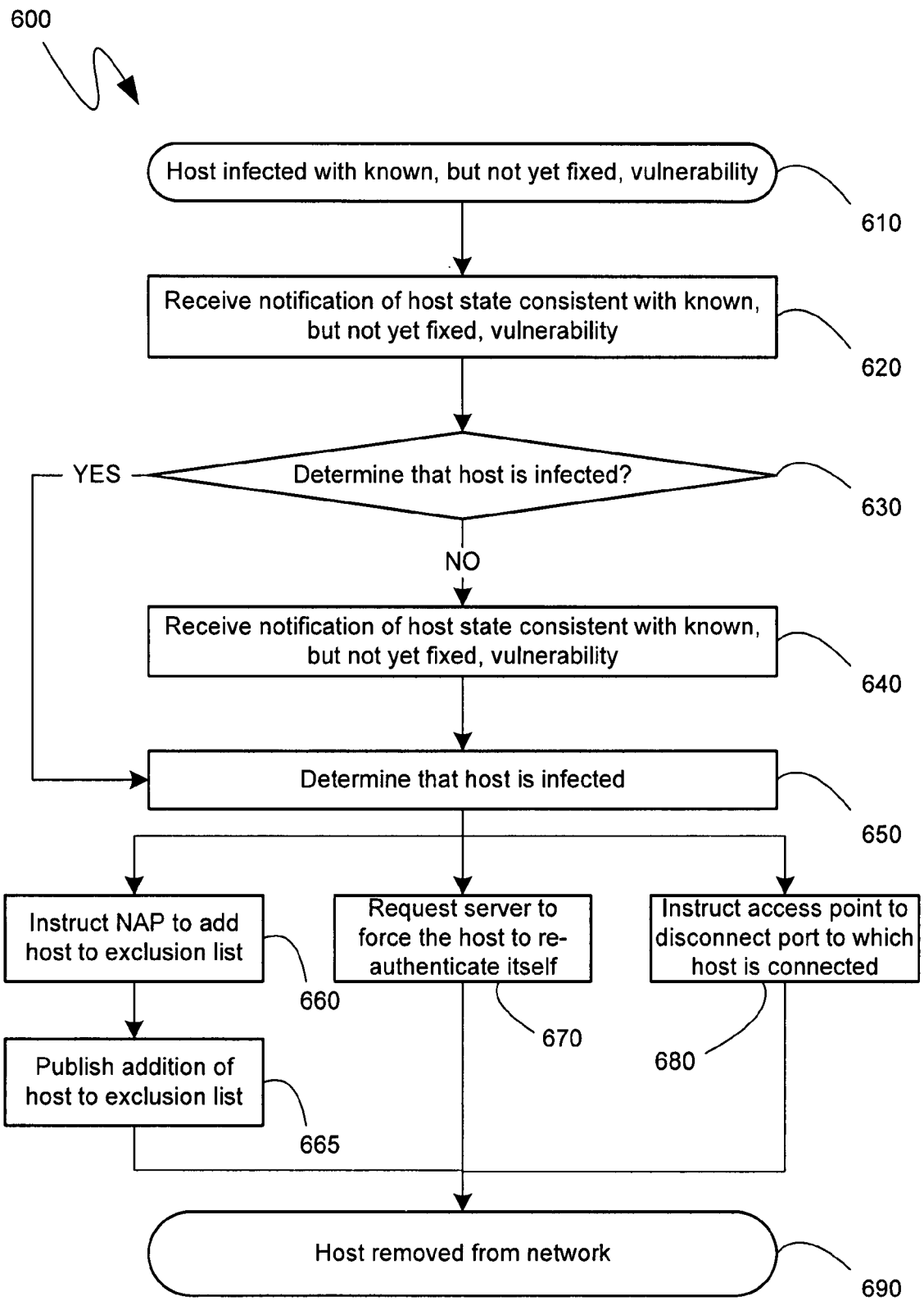
FIG. 7 is flow diagram of exemplary steps associated with a change in the network state of a device triggered by a known, but not yet fixed, vulnerability.

While unknown vulnerabilities can be detected based on the heuristic analysis described above, there may exist vulnerabilities that are known, and can therefore be more accurately detected, but for which no mitigating defense has yet been developed the NRMS 210 and the NSD 220 can likewise aid in the protection of the network 90 in the case of such known, but not yet fixed, vulnerabilities. FIG. 7 illustrates a flowchart 600 showing the operation of the NRMS 210 and the NSD 220 in the case of such known, but not yet fixed, vulnerabilities. Initially, as shown, at step 610, a host can become exploited by a known vulnerability for which no mitigating defense has yet been designed. The NRMS 210 can receive notification of such an exploit, again, either directly or through the NSD 220, as described in detail above. Upon receipt of such notification at step 620, the NRMS 210 can decide, as before, whether such a notification is sufficient to determine that the host is infected. If, at step 630, the NRMS 210 determines that the notification is sufficient to conclude that the host is infected, it can proceed to fashion an appropriate response, as exemplified by steps 660 through 680. However, if at step 630, the NRMS 210 determines that further information is required, it can wait until such information is received at step 640 before determining that the host is infected at step 650.

As before, various embodiments contemplate a range of remedial action, including remedial action that does not entail the removal of the host from the network 90, though such embodiments are the only ones specifically illustrated in flowchart 600. Indeed, the remedial action taken, including how and when a host is removed, can be policy driven. Turning back to flowchart 600, as shown, if the NRMS 210 determines that the infected host should be removed from the network 90, it can, for example, instruct the NAP server 53 to add the host to the network exclusion list at step 660 and at step 665, the NRMS can publish such an action on the part of the NAP server to the subscribers; or, at step 670, the NRMS 210 can itself request appropriate servers, such as the DHCP server 22 or NAP server 53, to force the host to re-configure or re-authenticate itself; or, at step 680, the NRMS 210 can itself directly instruct appropriate access devices 30 to terminate the connection between the host and the network 90. In any of these embodiments, the ultimate step 690 can result in the removal of the suspicious host from the network 90, thereby protecting the network 90 from known vulnerabilities for which mitigating defenses have not yet been designed.

As can be seen from the above descriptions, a Network State Database can maintain information regarding the network-centric state of one or more computing devices on a network, which can then be used by a Network Risk Management Service to appropriate respond to the information in the NSD and protect the network. In view of the many possible variations of the subject matter described herein, we claim as our invention all such embodiments as may come within the scope of the following claims and equivalents thereto.

We claim:

1. One or more computer-readable storage media comprising computer-executable instructions for managing risk in a network, the computer-executable instructions directed to steps comprising:
   requesting information indicative of a target computing device's compliance with a policy of a network of which the target computing device is already a member, from a network security computing device that is part of the network and protects the network, and an edge infrastructure computing device that is part of the network and provides access to inter-network services to members of the network;

obtaining, in response to the requesting, multiple sets of information indicative of the target computing device's compliance with the policy of the network;

publishing at least some of the multiple sets of information to subscriber computing devices comprising both a gatekeeper computing device that controls membership of the network and the edge infrastructure computing device, wherein at least some of the subscriber computing devices utilize the published information and the network policy to determine a remedial responsive action that they will apple with respect to the target computing device; and instructing an infrastructure computing device that is part of the network and provides access to intra-network services to members of the network and an access device through which the target computing device is communicationally coupled to the network, to cease communications with the target computing device if the obtained multiple sets of information are indicative of the target computing device no longer complying with the policy of the network, wherein the instructing is in accordance with the remedial responsive action.

2. The computer-readable storage media of claim 1 comprising further computer-executable instructions for storing into a network state database, and associating with the target computing device, the multiple sets of information.

3. The computer-readable storage media of claim 1, wherein the requesting the information indicative of the target computing device's compliance with the policy of network comprises polling the network security computing device or the edge infrastructure computing device to determine if the network security computing device or the edge infrastructure computing device comprises any new information indicative of the target computing device's compliance with the policy of network.

4. The computer-readable storage media of claim 1, wherein the obtaining comprises receiving, from at least one of the network security computing devices or the edge infrastructure computing device, an asynchronous notification of new information indicative of the target computing device's compliance with the policy of the network.

5. The computer-readable storage media of claim 1, wherein the instructing is only performed after double-checking one portion of the multiple sets of information with another, different portion of the multiple sets of information.

6. A method for managing risk in a network comprising the steps of:

requesting information indicative of a target computing device's compliance with a policy of a network of which the target computing device is already a member, from a network security computing device that is part of the network and protects the network, and an edge infrastructure computing device that is part of the network and provides access to inter-network services to members of the network;

obtaining, in response to the requesting, multiple sets of information indicative of the target computing device's compliance with the policy of the network;

publishing at least some of the multiple sets of information to subscriber computing devices comprising both a gatekeeper computing device that controls membership of the network and the edge infrastructure computing device, wherein at least some of the subscriber computing devices utilize the published information and the network policy determine a remedial responsive action that they will apply with respect to the target computing device; and instructing an infrastructure computing device that is part of the network and provides access to intra-network services to members of the network and an access device through which the target computing device is communicationally coupled to the network, to cease communications with the target computing device if the obtained multiple sets of information are indicative of the target computing device no longer complying the policy of the network, wherein the instructing is in accordance with the remedial responsive action.

7. The method of claim 6 further comprising the steps of storing into a network state database, and associating with the target computing device, the multiple sets of information.

8. The method of claim 6, wherein the requesting the information indicative of the target computing devices's compliance with the policy of the network comprises polling the network security computing devices or the edge infrastructure computing device to determine if the network security computing devices or the edge infrastructure computing device comprise any new information indicative of the target computing device's compliance with the policy of the network.

9. The method of claim 6 wherein the obtaining comprises receiving, from at least one of the network security computing device or the edge infrastructure computing device, an asynchronous notification of the new information indicative of the target computing device's compliance with the policy of the network.

10. A system comprising a network state database and a network risk management service, both communicationally coupled a network, the network state database comprising information indicative of a target computing device's compliance with a policy of the network of which the target computing device is already a member, and the network risk management service comprising a communication module for requesting and obtaining the information from a network security computing device that is part of the network and protects the network, and an edge infrastructure computing device that is part of the network and provides access to inter-network services to members of the network and for publishing at least some of the information to subscriber computing devices and an analysis module for analyzing the information to determine a remedial responsive action, the remedial responsive action comprising instructing an infrastructure computing device that is part of the network and provides access to intra-network services to members of the network and an access device through which the target computing device is communicationally coupled to the network, to cease communications with the target computing device.

11. The system of claim 10, wherein the information of the network state database is stored on multiple computing devices that are members of the network, with each element of the information being stored on a computing device which initially obtained the element.

12. The system of claim 10, wherein the obtaining the information comprises receiving an asynchronous notification that was triggered by an occurrence of an event impacting the target computing device's compliance with the policy of the network.

13. The system of claim 10, wherein at least some of the subscriber computing devices reference the network policy to determine an action that they will perform with respect to the target computing device, the action being in accordance with the remedial responsive action determined by the analysis module of the network risk management service.

14. The system of claim 10, wherein the requesting the information comprises polling the network security computing device or the edge infrastructure computing device to determine if the network security computing device or the edge infrastructure computing device comprise any new information indicative of the target computing device's compliance with the policy of the network.

\* \* \* \* \*